G. MOSTELLER.
Hay and Cotton Presses.
No. 149,508. Patented April 7, 1874.
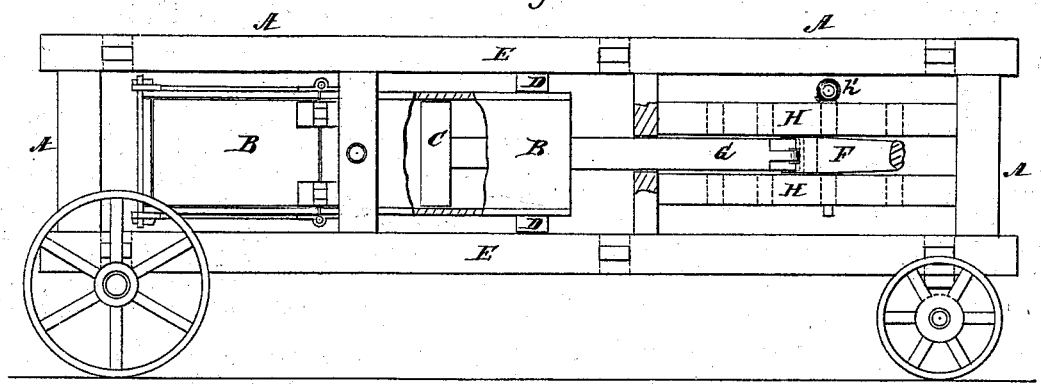
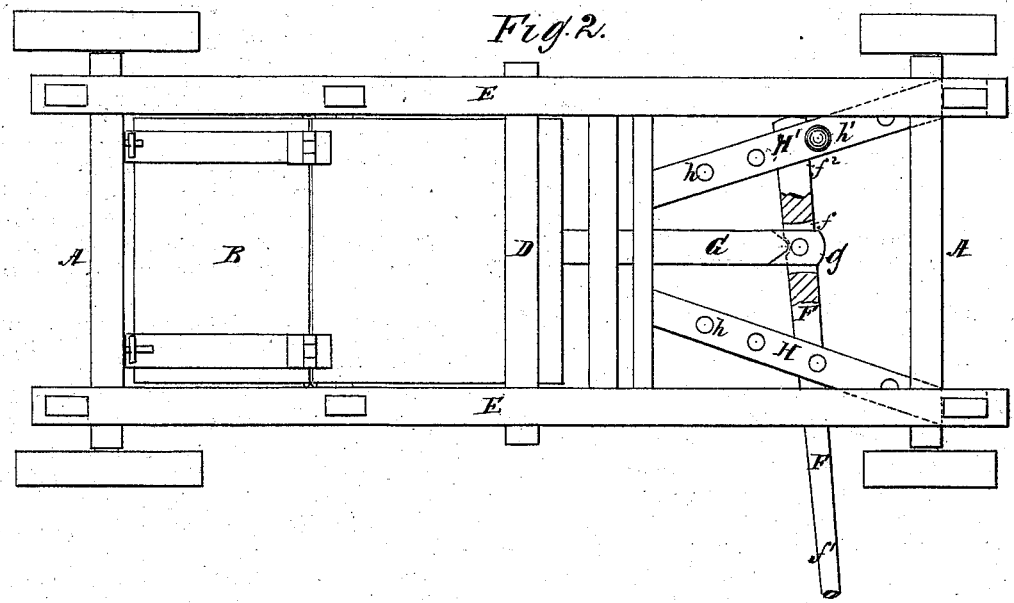
Witnesses:
G. Mathys.
John C. Kenson
Inventor:
George Mosteller
Per
Attorneys

UNITED STATES PATENT OFFICE.

GEORGE MOSTELLER, OF WALKER, GEORGIA.

IMPROVEMENT IN HAY AND COTTON PRESSES.

Specification forming part of Letters Patent No. 149,508, dated April 7, 1874; application filed November 1, 1873.

*To all whom it may concern:*

Be it known that I, GEORGE MOSTELLER, of the city and county of Walker and State of Georgia, have invented a new and Improved Hay and Cotton Press; and I do hereby declare that the following is a full, clear, and exact description of the same, reference being had to the accompanying drawing forming a part of this specification, in which—

Figure 1 is a side elevation, partly broken out. Fig. 2 is a top view, partly broken out.

The invention relates generally to all kinds of presses for baling cotton, hay, or straw, but more particularly to such as are transported upon wheels to and through the field, thus enabling the crop to be baled without being transferred to the barn.

A represents a frame on wheels, and B a press-box pivoted in the frame, and provided with a follower, C, that may be withdrawn therefrom. When this is done, the press-box may be turned on its trunnions until it assumes a vertical position, when the hay, cotton, or straw is inserted and the press-box again turned into a horizontal position. Cross-bars D are now placed above and below, and between the beams E E of frame and the press-box, so as to hold the latter securely in position. The follower is then inserted, forced home, and the bale held in a compressed state at the lower end of press-box, wherefrom, after being tied, it is allowed to be withdrawn, the top, sides, bottom, and ends being hinged and latched together. This is all old, and forms no part of my invention. F is the working hand-lever by which the follower is operated, and has a mortise, $f$, whereby it receives a tenon, $g$, of the follower-rod G. Transversely through the tenon and mortise sides pass apertures, in which is inserted the pivot-pin of lever F. H H and H′ H′ are the guides, between which move the two arms $f^1$ $f^2$ of the lever. These guides have holes $h$ $h$, through which pass the fulcrum-pins $h'$ $h'$, and are made to converge from their upper ends downwardly toward the follower, to give the increasing leverage required as the bale becomes more and more condensed.

By this construction, the operator puts one fulcrum-pin in guides H H and presses in one direction until he can insert another in guides H′ H′ in a correspondingly lower hole. He then changes his fulcrum, and forces his lever in the opposite direction until a pin can be inserted in a lower hole of guides H H. He proceeds in this way until the lowest possible hole is attained in each pair of guides, at each step leverage being gained by shortening the distance of the fulcrum-pins $h'$ from the follower-rod G, while the distance of the power-arm $f^1$ from that point remains always the same.

Having thus described my invention, what I claim as new, and desire to secure by Letters Patent, is—

The combination, with the cotton-press follower, of the rod G, lever F, and the two pairs of conveying-guides H H′, the lever-arms $f^1$ $f^2$ being on opposite sides of said rod G, and alternately worked on a changeable fulcrum-pin in each pair of guides, as and for the purpose set forth.

The above specification of my invention signed by me this 9th day of October, 1873.

GEORGE MOSTELLER.

Witnesses:
SOLON C. KEMON,
CHAS. A. PETTIT.